US011003160B1

(12) United States Patent
Smiddy

(10) Patent No.: US 11,003,160 B1
(45) Date of Patent: May 11, 2021

(54) METHOD AND SYSTEM FOR Z-AXIS IMPACT RESISTANCE FOR MACHINING

(71) Applicant: Thermwood Corporation, Dale, IN (US)

(72) Inventor: Brian S. Smiddy, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 17/125,196

(22) Filed: Dec. 17, 2020

(51) Int. Cl.
*G05B 19/4061* (2006.01)
*B23Q 15/12* (2006.01)

(52) U.S. Cl.
CPC ........ *G05B 19/4061* (2013.01); *B23Q 15/12* (2013.01); *G05B 2219/33099* (2013.01); *G05B 2219/37622* (2013.01)

(58) Field of Classification Search
CPC ...... G05B 19/4061; G05B 2219/37622; G05B 19/33099; B23Q 15/12
See application file for complete search history.

(56) References Cited

U.S. PATENT DOCUMENTS

| | | | | |
|---|---|---|---|---|
| 4,400,118 A | * | 8/1983 | Yamakage | B23B 29/03457 408/3 |
| 4,637,775 A | * | 1/1987 | Kato | B23Q 9/0064 414/744.2 |
| 6,932,547 B2 | * | 8/2005 | Hardesty | B23Q 5/04 408/127 |
| 8,610,393 B2 | * | 12/2013 | Barkman | G05B 19/401 318/561 |
| 8,641,338 B2 | * | 2/2014 | Yoneyama | B23Q 1/0018 409/135 |
| 9,207,060 B2 | * | 12/2015 | Mraz | G01B 7/008 |

* cited by examiner

*Primary Examiner* — Rina I Duda
(74) *Attorney, Agent, or Firm* — Bookoff McAndrews, PLLC

(57) ABSTRACT

A multi-axis machine includes a horizontally-displaceable carriage, a vertically-displaceable column, a spindle supported distally of the column, a motor configured to change a position of at least one of the carriage, the column, or the spindle; and an impact detection mechanism. The impact detection mechanism includes a first plate, a second plate secured distally of the first plate, and a sensor configured to detect a motion of the second plate with respect to the first plate.

20 Claims, 5 Drawing Sheets

METHOD AND SYSTEM FOR Z-AXIS IMPACT RESISTANCE FOR MACHINING

TECHNICAL FIELD

Aspects of the present disclosure relate to computer numeric control ("CNC") machines. In some instances, aspects of the present disclosure relate to 5-axis CNC machines and, in particular, to retaining alignments of the 5-axis CNC machine even after collisions of the machining head into parts, fixtures, part of the machine, etc. during operation of the CNC machine.

BACKGROUND

CNC machines, such as CNC routers, are used to rout, cut, drill, shape, or perform other processes on various materials, such as wood, plastic, phenolics, aluminum, or others, forming one or more desired objects. Some CNC machines, which are referred to as "5-axis" machines, have the ability to move in five different degrees of freedom. At least some 5-axis machine employ a stationary base, which has considerable size and weight to stabilize the machine. An upright, stationary gantry is typically mounted to the stationary base, which rests on the floor. Some machines include one or more moving tables that are mounted to the top of the stationary base. The stationary or fixed gantry must have a sufficient size and stiffness, which can be considerable, in order to adequately support components such as a movable column, which can be attached to the stationary gantry, and a machining head at the end of the column. When one or more moveable tables are included in the machine, these tables may move on bearings attached to rail ways in a linear degree of freedom. During operation, the carrier moves on the gantry in a linear direction parallel to the gantry. The column itself moves up and down with respect to the gantry in another linear direction. The machining head carrier rotates in a first plane, while the machining spindle rotates in another plane. The machining head carrier rotates in a third plane.

If, during operation, one or more of the axes experiences an out of tram state, or out of alignment state, due to a collision or other impact, the program executed on the controller for controlling the CNC machine may produce an item that is unusable. When unusable items are produced, a significant amount of time and material are wasted. Also, out of tram conditions cause loss of time, in terms of both production and manpower, to have a skilled mechanic to realign the machine so it is back in tram. Realignments also increase cost. Therefore, a design that would prevent at least some collisions from producing an out of tram state would be beneficial.

SUMMARY

Aspects of the present disclosure relate to, among other things, CNC machines and multi-axis CNC machines. In particular, aspects of the present disclosure relate to alignment states for one or more axes of a multi-axis machine, such as a 5-axis machine. Each of the aspects disclosed herein may include one or more of the features described in connection with any of the other disclosed aspects. One or more of the disclosed aspects may be useful to prevent out of tram states on multi-axis machines when a collision occurs.

In one aspect, a multi-axis machine may include a horizontally-displaceable carriage, a vertically-displaceable column, a spindle supported distally of the column, a motor configured to change a position of at least one of the carriage, the column, or the spindle, and an impact detection mechanism. The impact detection mechanism may include a first plate, a second plate secured distally of the first plate, and a sensor configured to detect a motion of the second plate with respect to the first plate.

In another aspect, a multi-axis machine for removing material from a part may include a displaceable carriage, a displaceable column secured to the carriage, a tool holder rotatably supported distally of the column, a motor configured to change a position of at least one of the carriage, the column, or the tool holder, an impact-sensitive body secured adjacent to the column, and an impact detection sensor including a probe configured to detect a collision having a force that causes the impact-sensitive body to move with respect to the column.

In yet another aspect, a multi-axis machine may include a carriage that is moveable in a first horizontal direction, a support column that is moveable in a vertical direction, and a worktable that is moveable in a second horizontal direction that is different than the first horizontal direction. The multi-axis machine may also include a machining head on the support column, the machining head being moveable with the carriage and the support column and a spindle and an impact detection mechanism.

In one or more aspects of the present disclosure, a pair of plates may be positioned on top of one another in a plane perpendicular to a vertical Z-axis and in the same plane as C-axis rotation. An upper or top plate may be mounted to the bottom of a Z-axis column while a lower or bottom plate may be mounted to the machining head so as to support the machining head on the Z-axis column. The bottom plate may include one or more raised protrusions which fit into notches or grooves formed in the top plate. The two plates may be held in position by bolts passing through both plates and through springs into securing rectangular blocks. The springs may have sufficient resistance to movement (e.g., due to the springs' compression) so as to hold the two plates together and prevent movement of the plates with respect to each other during normal operation. In some aspects, electrical devices, which may include one or more sensors, may be positioned on a top surface of the rectangular blocks to sense movement of the blocks with respect to each other. If the machining head experiences a collision with a part, fixture, component of the machine, or other obstacle, with enough force to at least partially separate the two plates, the electrical devices on top of the rectangular blocks will sense the collision and the relative motion of the top and bottom plates. In response to detecting a collision, the electrical devices and/or a controller may shut off the servomotors (e.g., by outputting commands to each servomotor that cause each servomotor to stop), immediately stopping motion of the machine. In some aspects, this action may limit the force of the collision. The force of the collision may be limited to an amount that allows the two plates to return to their desired positions without causing any component of the machine to fall out of alignment. In some aspects, the return of the plates to their original positions can be achieved by the force of one or more resilient members, such as springs, and without the need for user intervention. Thus, the machine may remain in tram and machining may be resumed once the obstacle is removed from the area. Additionally, damage to the machine or the obstacle may be avoided by causing the machine to immediately stop once an obstacle is detected with the electrical devices.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, multi-axis CNC machines, such as 5-axis CNC machines, configured to retain an alignment state. In particular, the systems and methods described herein may allow machines, such as 5-axis CNC machines, to remain in tram even after a collision involving the machining head.

Figure 1:
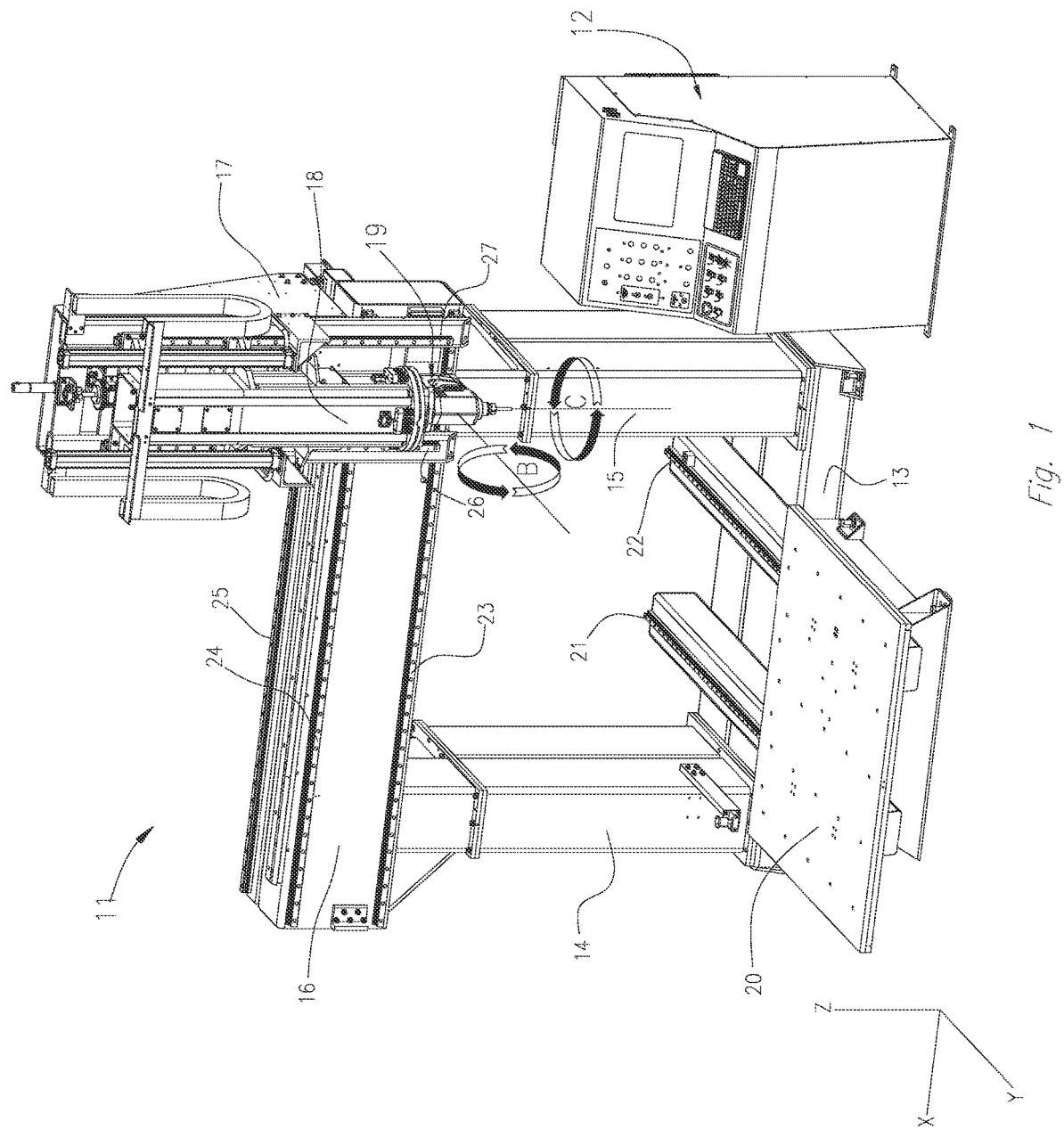
FIG. 1 is a perspective view of an exemplary 5-axis CNC machine operable for a machining process, such as routing, cutting, drilling, shaping, and/or other processes, according to an aspect of the present disclosure.

Referring to FIG. 1, a machining system may include a multi-axis machine, such as CNC machine 11 and a controller 12. CNC Machine 11 may be controlled and/or programmed by controller 12. Machine 11 may include a base 13 provided with a pair of transversely spaced legs 14 and 15, a machining gantry 16 supported on legs 14 and 15, a carriage 17 mounted on machining gantry 16, a vertically-extending Z-column 18 mounted on carriage 17, and a machining head 19 mounted on Z-column 18. Z-column 18 is an exemplary support column, and may support machining head 19 and an impact resistance mechanism, as described below. A horizontal worktable 20 may include a support surface disposed in an X-Y plane, and may be supported on base 13 so as to extend between legs 14 and 15. Machining gantry 16 may be disposed so as to extend horizontally along an X-axis, supported at the ends thereof by legs 14 and 15. Horizontal worktable 20 may be secured to base 13 by a set of guide rails 21 and 22 so as to be movable along a Y-axis. The horizontal worktable 20 may be displaceable by a servomotor (not shown) mounted on the horizontal worktable 20 and operably connected to a track provided on base 13. Carriage 17 may be supported on machining gantry 16 and may be displaceable along one or more horizontally-extending guide rails 23, 24, and 25, provided on machining gantry 16. For example, carriage 17 may be displaceable along the X-axis on one or more of guide rails 23, 24, and 25, by a servomotor mounted on carriage 17 and operably connected to machining gantry 16. Z-column 18 may be mounted on a set of spaced, vertically-extending guide rails 26 and 27. Guide rails 26 and 27 may be supported on the carriage 17 for displacement of the Z-column 18 relative to carriage 17 along the Z-axis. Z-column 18 may be displaceable along the Z-axis by a servomotor mounted on carriage 17 and operably connected to the Z-column 18. Machining head 19 may be attached at a bottom end of Z-column 18 which may be configured to rotate in a plane perpendicular to the Z-axis (e.g., the C-axis in FIG. 1) and in a plane perpendicular to the Y-axis (e.g., the B-axis in FIG. 1).

Figure 2:
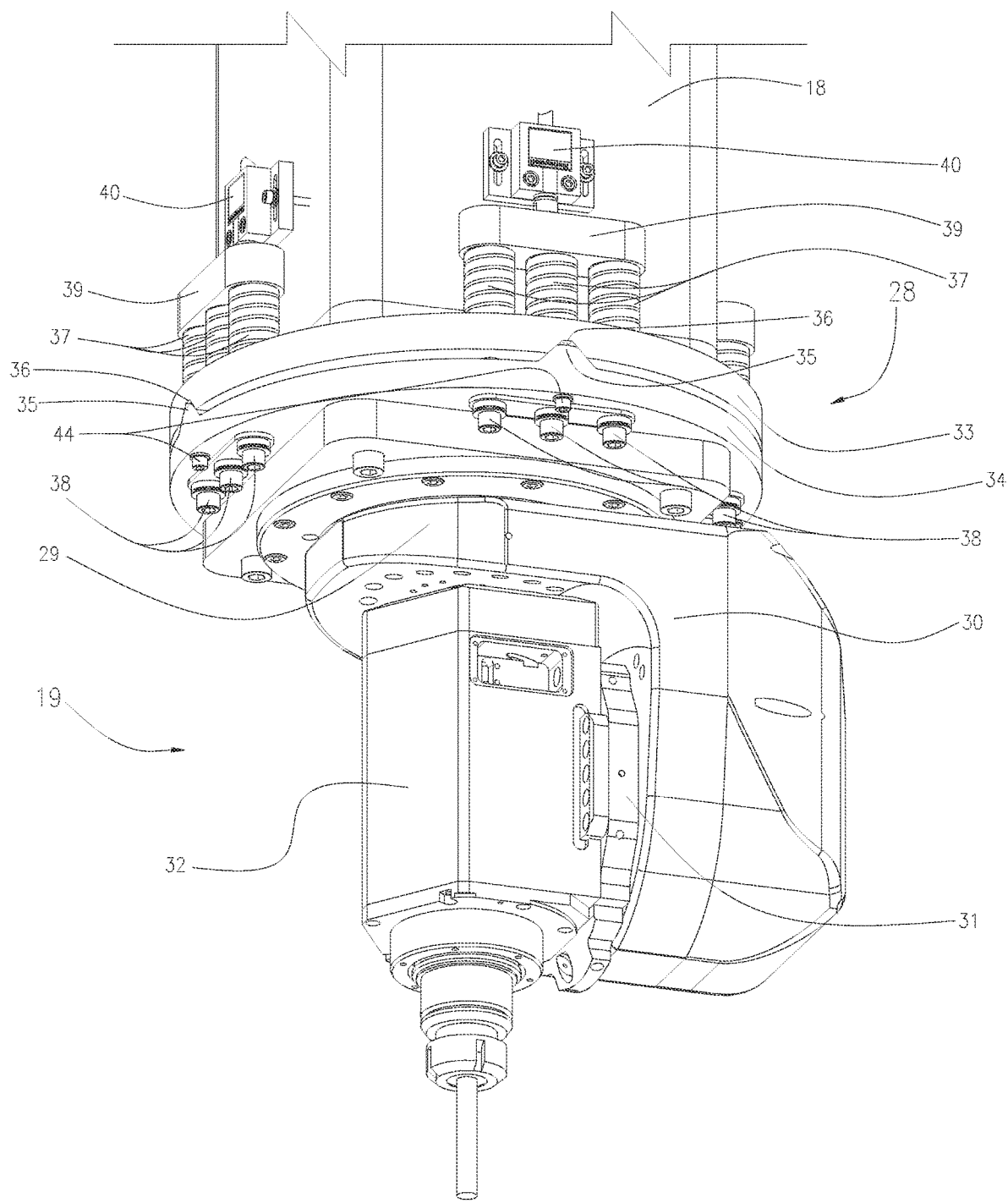
FIG. 2 is a perspective view of an Z-column, impact resistance device and machining head of the exemplary CNC machine shown in FIG. 1.
Figure 3:
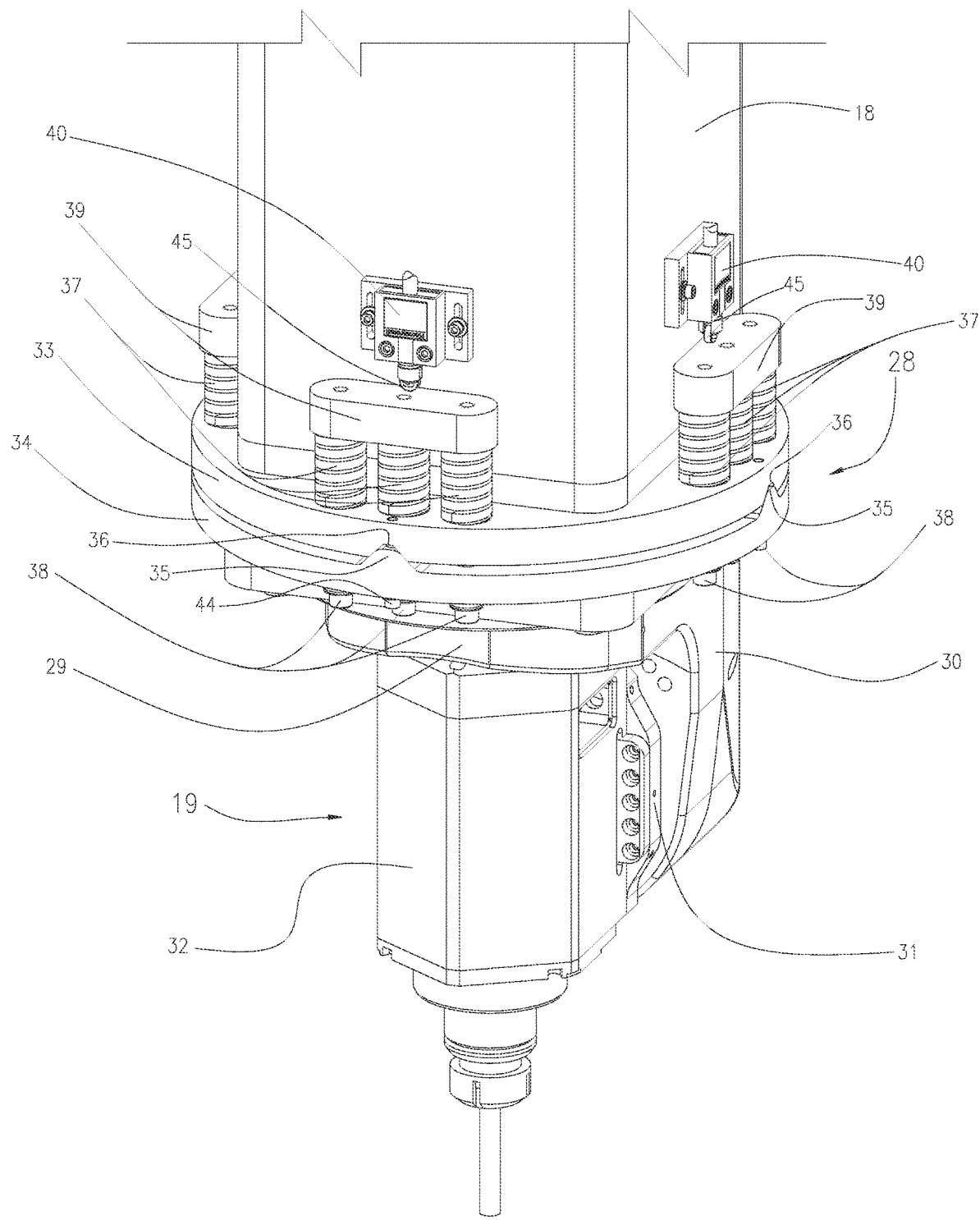
FIG. 3 is a perspective view of an Z-column, impact resistance device and machining head of the exemplary CNC machine shown in FIG. 1.

With reference to FIGS. 2 and 3, an impact detection or resistance mechanism 28 may be mounted at the end of Z-column 18. Z-column 18 may have a rectangular shape with a series of flat side walls to which electrical devices 40 are secured. Z-column 18 may extend from machining head 19 and impact resistance mechanism 28 and may be positioned in front of machining gantry 16 and carriage 17 in a direction parallel to the Y-axis.

As shown in FIGS. 2 and 3, machining head 19 may be mounted to a distal end of impact resistance mechanism 28 so as to be secured below both Z-column 18 and impact resistance mechanism 28. Machining head 19 may include a C-axis rotation gearmotor 29 that is rotatably mounted to a proximal or top end of a machining head carrier 30. A B-axis rotation gearmotor 31 may be attached to a distal or bottom end portion of machining head carrier 30, which is attached to a machining spindle 32. During operation of machine 11, motors 29 and 31 may be configured to controllably position a machining tool secured by a tool holder or machining spindle 32 at any desired angle for the machining process by rotating spindle 32 with respect to the C-axis and B-axis (FIG. 1).

Figure 4A:
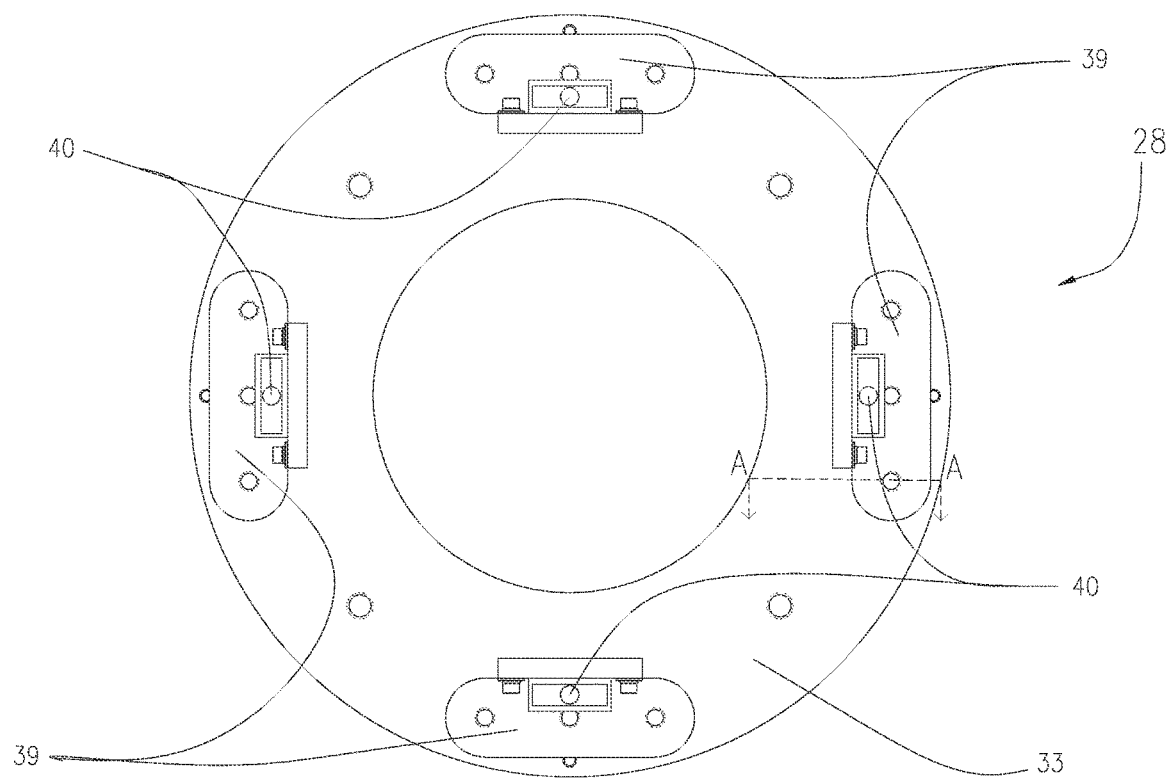
FIG. 4A is a top view of an exemplary impact resistant apparatus shown in FIGS. 2 and 3.
Figure 4B:
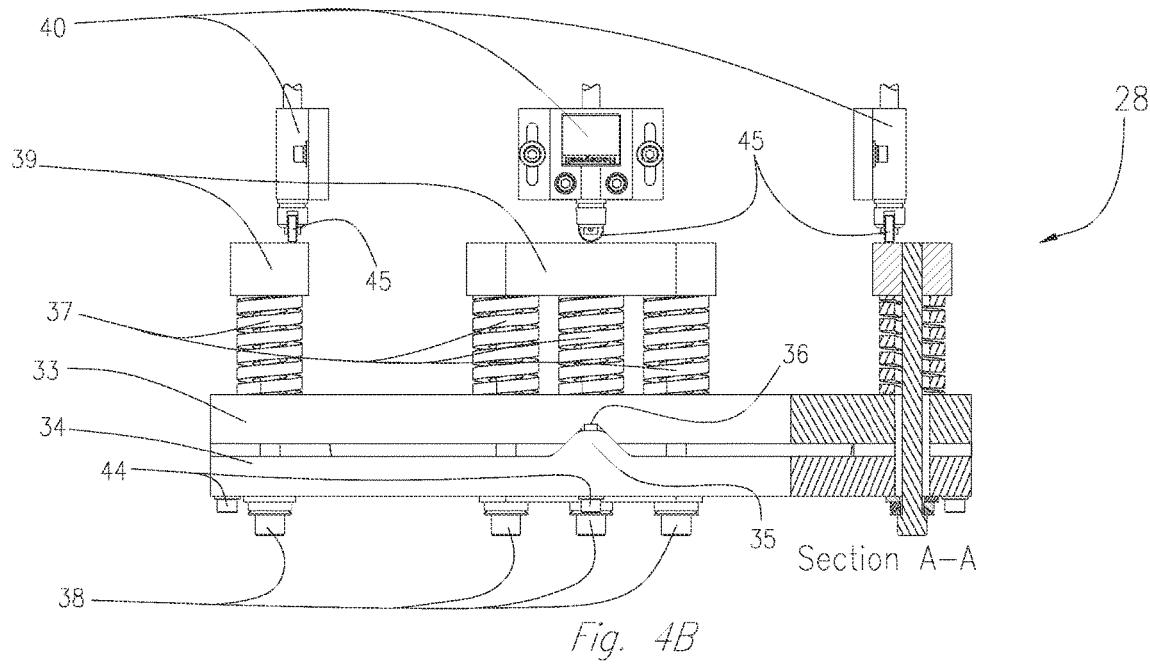
FIG. 4B is a side view which contains a partial cross-sectional view of an exemplary impact resistance device shown in FIGS. 2 and 3.

As shown in FIGS. 2 and 3, as well as the top view of FIG. 4A and the side view of FIG. 4B, impact resistance mechanism 28 may include two annular or circle-shaped plates, including an upper or top plate 33 and a lower or bottom plate 34. Top plate 33 and bottom plate 34 may each include a hole extending through a central portion of the plate 33 and 34, the hole being sized and positioned so that electrical wires and/or air lines may to pass therethrough. If desired, plates 33 and 34 may have different shapes, such as a triangular shape, rectangular shape, etc.

Top plate 33 may be mounted to the bottom of Z-column 18 while bottom plate 34 is mounted above machining head 19. Bottom plate 34 may include one or more V-shaped protrusions 35 that fit into respective V-shaped depressions or notches 36 in the top plate 33. In an exemplary configuration, bottom plate 34 may include four V-shaped protrusions 35, while four V-shaped notches 36 may be formed in top plate 33. While in this exemplary configuration the number of V-shaped protrusions 35 and V-shaped notches 36 is the same, in other configurations, the number of V-shaped notches 36 may be larger than the shape of V-shaped protrusions 35. Additionally, while protrusions 35 and notches 36 are described as being "V-shaped" herein, protrusions 35 and notches 36 may have other shapes. Additionally, as best shown in FIG. 4B, each V-shape may include a first angled portion, a second angled portion, and a bridge between these two angled portions. The bridge portion may be substantially flat (e.g., notch 36, FIG. 4B), or may be rounded. Regardless of the particular shape of protrusions 35 and notches 36, protrusions and/or notches 36 may form a pair of mating surfaces that slide with respect to each other when a collision occurs. While plate 33 is shown with notches 36, and plate 34 is shown with protrusions 35, plate 33 may instead be provided with protrusions 35, and plate 34 may be provided with notches 36. In another configuration, each of plates 33 and 34 may include at least one protrusion 35 and at least one notch 36, such that each protrusion 35 of one of the plates 33, 34 is received by a respective notch 36 of the other plate.

Top plate 33 and bottom plate 34 may be held together by spring assemblies including one or more sets of springs 37.

In some aspects, the number of spring assemblies, which each include a set of springs 37, may be the same as the number of V-shaped protrusions 35 and V-shaped notches 36. The number of springs 37 in each set of springs 37 may be one, two, four, or more. In an exemplary configuration shown in the Figures, the number of springs 37 in each set may be three, and each spring assembly including a set of springs 37 may be evenly spaced around the plates. Springs 37 may be pulled into compression by one or more (e.g., four) sets of bolts 38 included as part of each spring assembly. The number of bolts 38 may be equal to the number of springs 37. Therefore, machine 11 may include a set of three bolts 38 in each spring assembly. The set of bolts 38 may be threaded into respective (e.g., four) impact-sensitive bodies, such as blocks 39 (threading not shown). For example, each block 39 may include an internally-threaded hole for receiving an end portion of bolt 38, which may include threading that mates with the threading of block 39. Alternatively, bolts 38 may be secured with a separate fastener (e.g., a nut), or by any other suitable attachment mechanism. Blocks 39 may be formed of steel or any other appropriate material.

Figure 5:
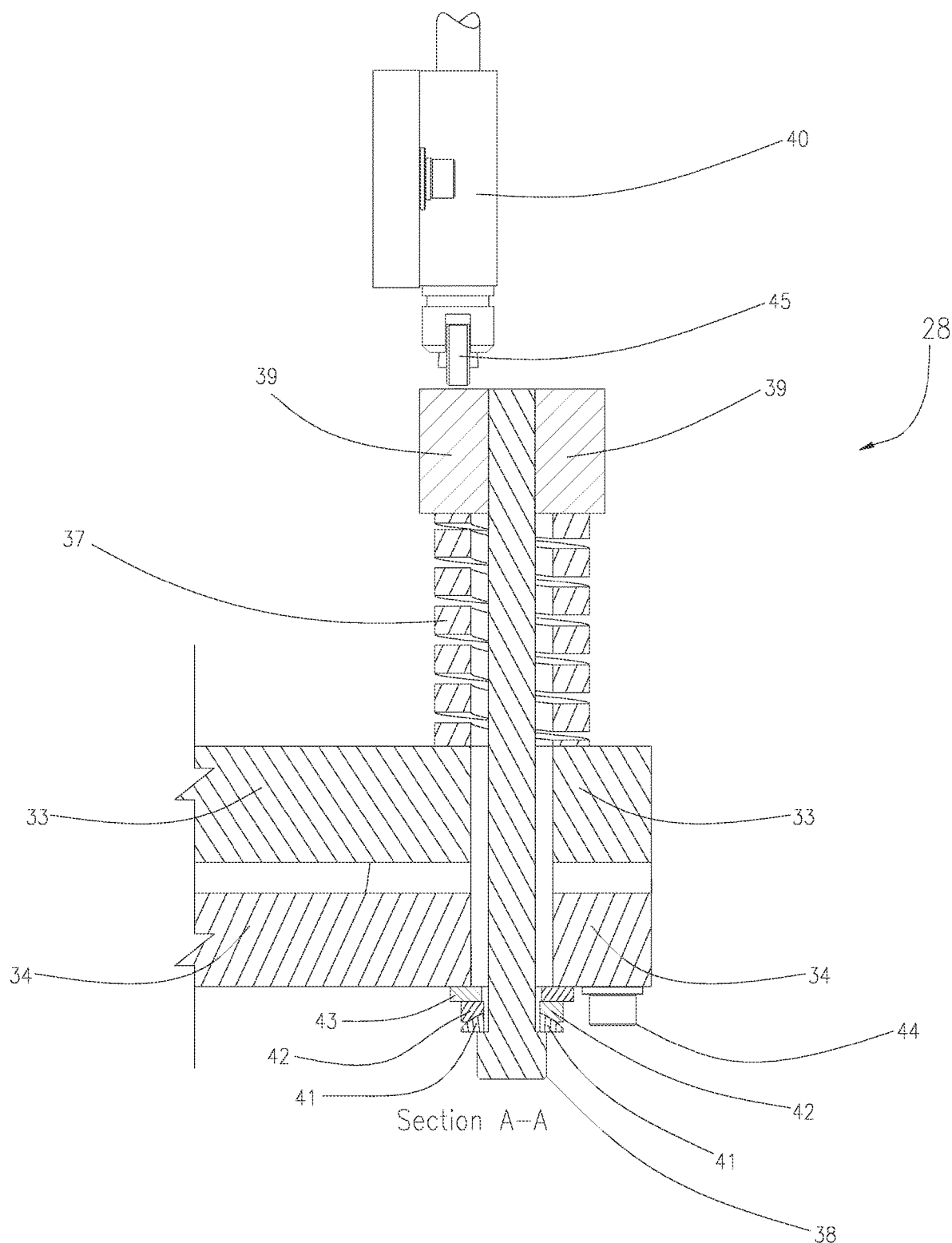
FIG. 5 is an enlarged cross-sectional view of Section A-A of FIG. 4A.

As shown in FIGS. 3-5, an electrical device 40 may be positioned on a top surface of each of the four impact-sensitive blocks 39 mounted to Z-column 18. Each electrical device 40 may include a sensor configured to detect movement in block 39. In particular, each device 40 may detect movement of block 39 caused by misalignment between plates 33 and 34, which may cause plate 33 to contact or change the state of a probe portion 45 provided at a distal end of electrical device 40. Blocks 39 may be biased to a resting position by spring assemblies and spring 37. In some configurations, probe portion 45 may be formed by a contact switch that is actuated by motion of block 39 away from this resting position, as a result of an impact or collision. If desired, probe portion 45 may be configured to measure an amount of motion, and electric device 40 may generate a signal indicative of this motion for controller 12. In other configurations, probe portion 45 may be a magnetic probe configured to measure an amount of motion of block 39 in a contact-free manner (e.g., by placing a magnetic component on block 39 and detecting a position of this component via a probe in probe portion 45). In configurations where a value or amount of movement is measured, when the measured amount of motion exceeds a predetermined threshold, controller 12 may stop the operation of machine 11.

In some aspects, springs 37 may be placed in a predetermined amount of compression, such that blocks 39 will move only when machining head 19 has a collision with an obstacle. Such a collision may have sufficient force to cause at least one of protrusions 35 to slide along a surface of a respective notch 36, so as to push plate 33 upward against the resistance of one or more springs 37, moving block 39 in a manner that is detected by probe portion 45 of electrical device 40.

As shown in FIG. 5, impact detection or resistance mechanism 28 may include bolts 38 having heads that sit on top of a plurality of respective convex washers 41. Convex washers 41 may include a convex central portion that protrudes outward away from the head of bolt 38. Each convex washer 41 may be positioned between the head of a respective bolt 38 and a concave washer 42, so as to be secured on top of concave washers 42. In particular, the bulging or convex portion of washer 41 may be received by a recessed or concave portion of one of the washers 42. Additionally, a flat surface of concave washer 42 may be placed on top of a flat washer 43, which is in contact with bottom plate 34. The combination of the convex washers 41 and concave washers 42 may allow bolts 38 the freedom to swivel and move in oversized holes extending through each of flat washers 43, bottom plate 34, top plate 33, and springs 37. In some aspects, convex washers 41 and concave washers 42 may provide plates 33 and 34 the ability to move rotationally and/or translate with respect to each other, thereby movably securing plates 33 and 34. As described above, this motion may be detected by one or more sensors, such as electrical devices 40.

When machining head 19 has a collision with a part, fixture, part of the machine, or other obstacle, the force of this collision may impart a rotational force on the machining head 19. This force may be in the same plane as the C-axis (FIG. 1) so as to force bottom plate 34 to rotate while the top plate 33 remains stationary. This rotation of bottom plate 34 may have sufficient force to cause one or more V-shaped protrusion 35 on bottom plate 34 to slide along a surface of a respective V-shape notch 36 in the top plate and force plate 33 and 34 apart. As plates 33 and 34 are forced apart, the motion of plates 33 and 34 with respect to each other pulls bolts 38 downward together with the bottom plate 34. The motion of bolts 38 may cause blocks 39, which are fixed to bolts 38, to be pulled downward as well, which in turn will be detected by the electrical device 40 positioned above each block 39 when the respective block 39 moves. When electrical device or devices 40 detect this motion, devices 40 may cause each servomotor of machine 11 to immediately stop, limiting the amount of impact the machining head 19 receives. This may be accomplished, for example, by generating signals with devices 40 that are received by controller 12. When controller 12 determines that an impact has occurred (e.g., an output from one or more devices 40 exceeds a predetermined threshold), controller 12 may cause each servomotor of machine 11 to stop. For example, controller 12 may output a control signal to each motor that causes the motion of at least one of the carriage 17, column 18, or spindle 32, to stop. In at least some examples, controller 12 may output signals that cause carriage 17, column 18, and spindle 32 to stop. If desired, these signals may include signals that stop the rotation of a machining tool secured by spindle 32.

When machining head 19 experiences a collision with a part, fixture, component of the machine, or other obstacle from the side or at an angle, this impact may result in a force on the bottom plate 34 which tends to separate plate 34 from the top plate 33 on one side, pulling plates 33 and 34 apart. Such an impact may have little or no effect on the opposite side. Thus, plates 33 and 34 may remain forced tightly together on the side opposite to the collision. As plates 33 and 34 are forced apart, as described above, this force may pull one or more bolts 38 downward with the bottom plate 34, which, in turn, may cause one or more blocks 39 to also be pulled downward. As a result, one or more electrical devices 40 may detect this motion, and may cause electrical power to be disconnected from controller 12. In an exemplary configuration, this disconnection of the power source (e.g., power from a 24 Volt power source) from controller 12 may cause controller 12 to enter an emergency stop condition in which power is removed from each of the servomotors of machine 11, causing these servomotors to immediately stop. Alternatively, when one or more of electrical devices 40 detects motion, the device(s) may output a signal to controller 12 indicative of this motion. When the electrical device or devices 40 or output this signal, controller 12 may output a command that causes servomotors of machine 11 to stop.

When the Z-, C-, and B-axes are aligned and in tram, and springs 37 are secured with a sufficient level of compression, the Z-axis may be perpendicular to the plane defined by the X- and Y-axes, the B-axis may be perpendicular to the Z-axis, and the C-axis may be perpendicular to the B-axis. When machining head 19 collides with a part, fixture, part of the machine, or other obstacle, the servomotors may be stopped, e.g., by controller 12, limiting the force of the impact. Therefore, machining head 19 may be moved away from the object with which machining head 19 collided. Then, impact resistant machining head 19, may, due to the action of opposing protrusions 35 and notches 36, re-center itself with the Z-, C- and B-axes so as to be in proper tram without the need for manual re-alignment.

Optionally, impact resistance mechanism 28 may include a mechanism that facilitates switching from an impact resistant model or mode of operation to a rigidly-fixed model or mode of operation. An example of such a mechanism is a set, e.g., four, medium sized bolts 44 that are inserted, at evenly spaced intervals, around impact resistance mechanism 28. In particular, impact resistance mechanism may include holes extending through the bottom plate 34 and top plate 33. In some aspects, one or both of these holes may be threaded. In this example, the insertion of bolts 44 may switch the mode of operation from an impact resistant type of design, to a rigidly fixed type of design. Thus, the insertion of bolts 44 may disable the operation of impact resistance mechanism 28 (e.g., relative motion of plates 33 and 34 is prevented). When the ability to sense a collision and stop operation of machine 11 is desired, each bolt 44 may be removed.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A multi-axis machine, comprising:
   a horizontally-displaceable carriage;
   a vertically-displaceable column;
   a spindle supported distally of the column;
   a motor configured to change a position of at least one of the carriage, the column, or the spindle; and
   an impact detection mechanism, including:
      a first plate;
      a second plate secured distally of the first plate; and
      a sensor configured to detect a motion of the second plate with respect to the first plate.

2. The multi-axis machine of claim 1, wherein the impact detection mechanism extends proximally of the spindle.

3. The multi-axis machine of claim 1, wherein the impact detection mechanism includes a spring assembly applying a force that pulls the first plate and the second plate together.

4. The multi-axis machine of claim 3, wherein the spring assembly extends through the first plate and through the second plate.

5. The multi-axis machine of claim 1, wherein the impact detection mechanism further includes a notch and a protrusion received by the notch, the first plate including the notch or the protrusion.

6. The multi-axis machine of claim 1, further including a controller configured to receive an output of the sensor and to cause the motor to stop based on the received output from the sensor.

7. The multi-axis machine of claim 6, wherein the multi-axis machine is a 5-axis CNC machine.

8. The multi-axis machine of claim 1, further including a machining head supported on the second plate, the machining head including the spindle, wherein the motor is configured to rotate the spindle.

9. A multi-axis machine for removing material from a part, comprising:
   a displaceable carriage;
   a displaceable column secured to the carriage;
   a tool holder rotatably supported distally of the column;
   a motor configured to change a position of at least one of the carriage, the column, or the tool holder;
   an impact-sensitive body secured adjacent to the column; and
   an impact detection sensor including a probe configured to detect a collision having a force that causes the impact-sensitive body to move with respect to the column.

10. The multi-axis machine of claim 9, wherein the impact-sensitive body is biased toward a resting position by one or more springs.

11. The multi-axis machine of claim 10, further including a first support secured to the spring such that the spring is positioned between the first support and the impact-sensitive body.

12. The multi-axis machine of claim 11, further including a second support movably secured to the first support.

13. The multi-axis machine of claim 12, further including a bolt that movably secures the second support to the first support.

14. The multi-axis machine of claim 12, further including a pair of sliding surfaces formed on the first support and the second support, respectively.

15. The multi-axis machine of claim 9, further including a controller configured to output a signal to the motor that causes motion of at least one of the carriage, the column, or the tool holder to stop, in response to an output from the impact detection sensor.

16. A multi-axis machine, comprising:
   a carriage that is moveable in a first horizontal direction;
   a support column that is moveable in a vertical direction;
   a worktable that is moveable in a second horizontal direction that is different than the first horizontal direction;
   a machining head on the support column, the machining head being moveable with the carriage and the support column and including a spindle; and
   an impact detection mechanism, including:
      an impact sensor configured to detect a collision of one or more moveable components of the multi-axis machine, wherein the multi-axis machine is configured to stop a motion of at least one of the carriage, the machining head, or the worktable, when the sensor detects the collision.

17. The multi-axis machine of claim 16, wherein the impact detection mechanism is secured to the support column.

18. The multi-axis machine of claim 16, further including a plurality of sensors configured to detect collisions, including the impact sensor.

19. The multi-axis machine of claim 18, wherein the plurality of sensors are each secured to the support column.

20. The multi-axis machine of claim 16, wherein the sensor includes a probe portion configured to come into contact with a moveable block, when the moveable block is displaced in the vertical direction.

* * * * *